Feb. 6, 1973   S. W. LITTLE   3,714,732
APPARATUS FOR DISENGAGING A FISHHOOK
Filed Dec. 17, 1970   2 Sheets-Sheet 1

INVENTOR.
SAMUEL WOODROW LITTLE
BY
Newton, Hopkins, & Ormsby
ATTORNEYS

United States Patent Office 3,714,732
Patented Feb. 6, 1973

3,714,732
APPARATUS FOR DISENGAGING A FISHHOOK
Samuel Woodrow Little, P.O. Box 404,
Milledgeville, Ga. 31061
Filed Dec. 17, 1970, Ser. No. 99,026
Int. Cl. A01k 97/00
U.S. Cl. 43—53.5     11 Claims

ABSTRACT OF THE DISCLOSURE

An apparatus for removing a fishhook lodged in the flesh of a fish including means for rotating a lodged fishhook with control means operatively associated with the rotating means for effecting a rotation of said rotating means so as to disengage the fishhook from its engaged placement and to retrieve the fishhook from the fish. The apparatus provides a novel method for automatically disengaging a fishhook from the flesh of a fish including the steps of wrapping the fishline attached to the hook around a fishhook rotating means and rotating the rotating means, thereby dislodging the fishhook from the fish. Another method disclosed for automatically disengageng a fishhook from the flesh of a fish includes the steps of wrapping the fishing line attached to the hook around a fishhook rotating means, engaging the fishhook with the rotating means, and rotating the rotating means whereby the fishhook will be disengaged from the flesh of the fish.

BACKGROUND OF THE INVENTION

Extracting a fishhook lodged in the flesh of a fish has presented problems in the past because this operation had to be manually accomplished. This extrication maneuver sometimes resulted in the fisherman receiving a wound in the hand from the fishhook as he endeavored to dislodge it from the fish. The wound arose because the fish would be flailing about as the angler attempted to disengage it from the fish, and unless the fish was small enough to be securely grasped by the fisherman so as to sufficiently subdue him, the barbed end of the fishhook would usually puncture his finger if he were not very careful. Also, the manual method of extracting the fishhook usually took some time and physical exertion on the fisherman's part, especially if the fishhook was securely lodged in the fish, as in the jaw area.

SUMMARY OF THE INVENTION

It is, therefore, a primary object of this invention to provide an apparatus for automatically extracting a fishhook from the flesh of a fish.

It is a further object of this invention to provide a fishhook extractor for removing a fishhook lodged in the flesh of a fish by rotating the fishhook from its engaged placement.

It is another object of this invention to provide a fishhook rotating means which can be adapted to fit a conventional spinning reel for effecting a rotation of the rotating means.

Another object of this invention is to provide a fishhook extractor that is adaptable to disengage a fishhook from various sizes of fish.

It is still another object of this invention to provide a fishhook extractor with a hook rotating means that is constructed of telescoping sections so as to effect various lengths of the plunger depending on how far into the mouth of the fish the hook is located.

It is another object of this invention to provide a method for automatically extracting a fishhook from the flesh of a fish.

An object of this invention is to provide a fishhook extractor that will disengage a fishhook regardless of how or where the fishhook is lodged in the flesh of a fish.

An additional object of this invention is to provide a method and apparatus for ertracting a fishhook from the flesh of a fish that insures that the fisherman will not be wounded by the fishhook during the extrication of the hook.

Another object of the present invention is to provide a fishhook extractor that is simple in construction and use, economical to manufacture, reliable in operation, and lightweight and sturdy in design.

Still other objects and advantages of the present invention will become apparent after reading the accompanying description of one illustrative embodiment of the invention with reference to the attached drawings wherein like reference characters have been used to refer to like parts throughout the figures of drawings.

DESCRIPTION OF THE ILLUSTRATIVE EMBODIMENTS

Figure 1:
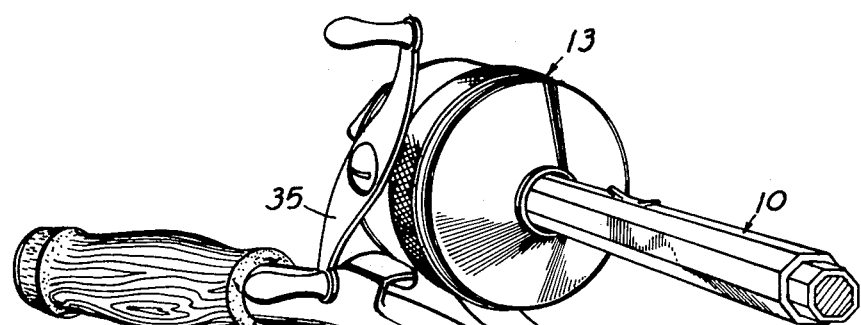
FIG. 1 is a perspective view of the hook extractor apparatus.
Figure 2:
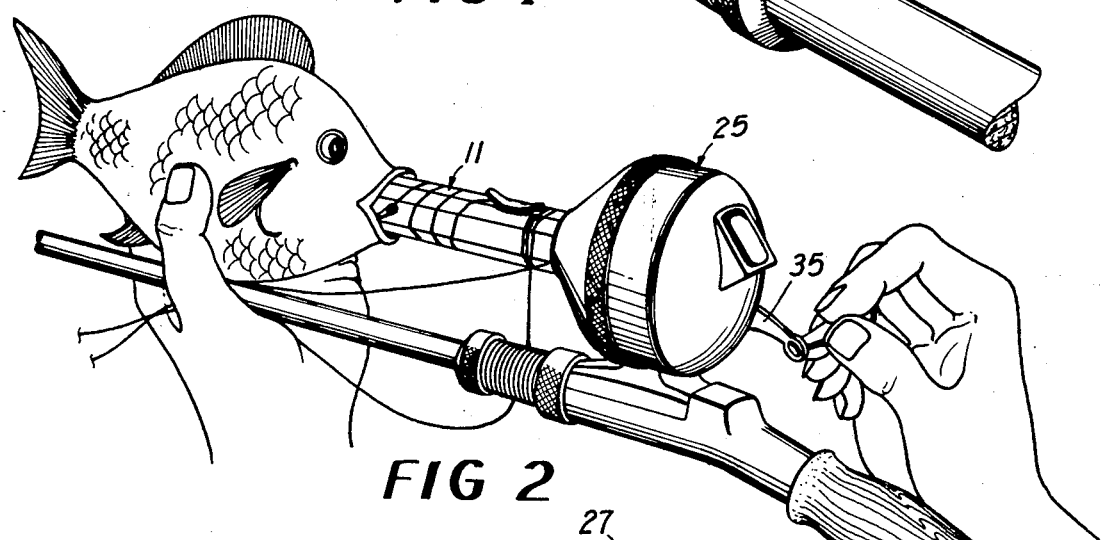
FIG. 2 is a perspective view of the hook extractor apparatus in operation.
Figure 4:
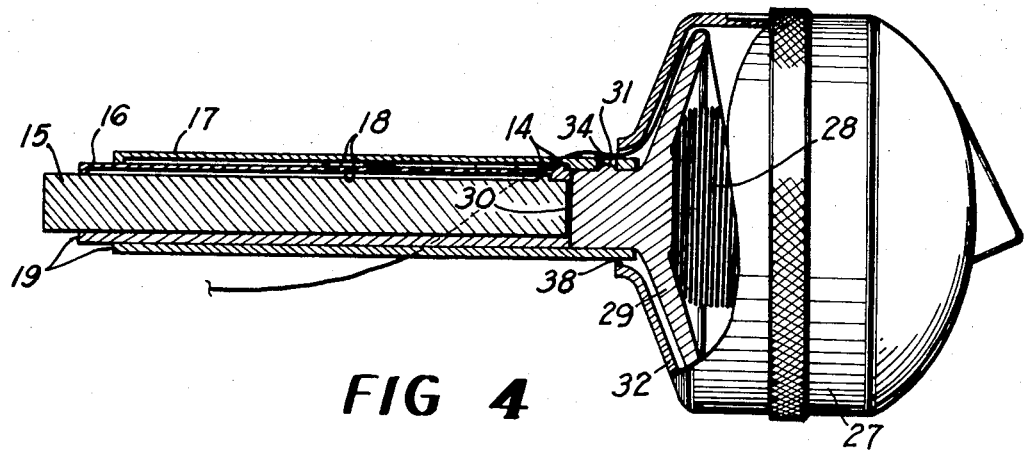
FIG. 4 is a cross-sectional side view of the fishhook extractor apparatus.

Referring now in detail to the embodiments chosen for the purpose of illustrating the present invention, numeral 10 denotes generally the hook extractor apparatus as shown in FIGS. 1, 2, and 4.

This device 10 includes a fishhook rotating means 11 which is an elongated, tubular member constructed of a plurality of telescoping sections for adjusting the effective length of the rotating means 11. The length of the hook rotating means 11 is extendable in this manner so that it can engage a fishhook 12 lodged at different distances down the mouth of the fish.

As shown in the figures, the sections of the rotating means 11 are hexagonal in shape, but it is understood that the sections could be detailed in any design (circular, square, etc.). The hexagonal shape of the sections aids in securing the rotating means 11 to the operable control means 13 which effects a rotation of the rotating means 11. It is also understood that there should be at least two telescoping sections, but there can be more than three sections as depicted in the figures.

Referring now to FIG. 4 which shows the rotating means in its normal, non-extended position, the telescopic sections are detailed to include means for limiting the effective forward length of the rotating means 11. This length adjusting means includes a stud 14 formed on the inner sections 15 and 16 of the rotating means 11. The studs 14 are located adjacent the rearward end of the sections. The studs 14 are in sliding engagement with complementary slots 18 which longitudinally extend along the inner surface of sections 16 and 17. An inwardly projecting lip portion 19 extends around the periphery of the forward ends of sections 16 and 17. The lip 19 prevents section 15 from being pulled free of section 16 and section 16 from being pulled free of section 17.

Figure 5:
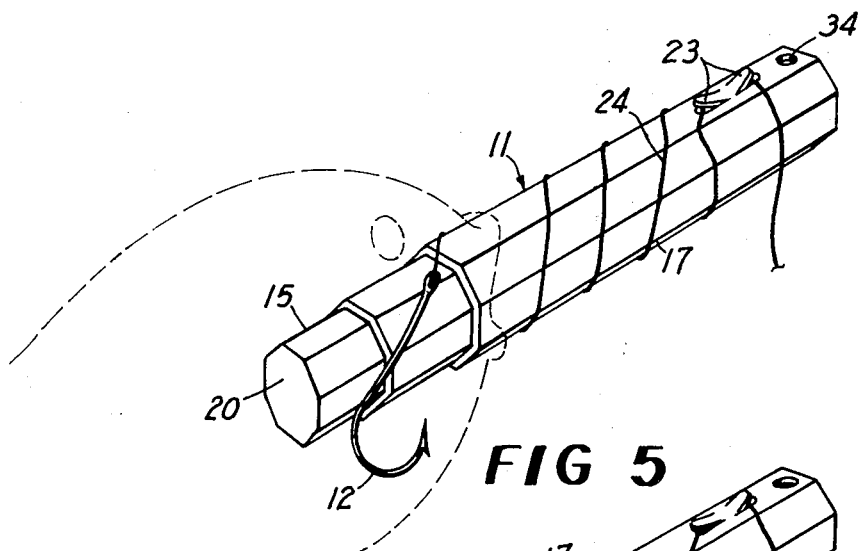
FIG. 5 is a perspective view of one embodiment of the operational end of the hook rotating means in engagement with a fishhook.
Figure 6:
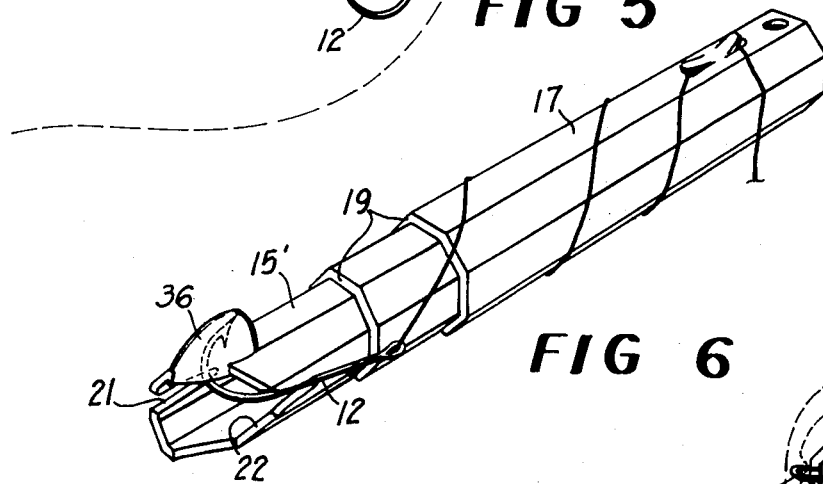
FIG. 6 is a perspective view of another embodiment of the operational end of the hook rotating means in engagement with a fishhook.

Two embodiments of the operative end of the hook rotating means 11 are shown in FIGS. 5 and 6, the operative end being the forward end of the innermost sections 15 and 15'. FIG. 5 depicts the operative end of section 15 as being a flat end surface 20. FIG. 6 depicts the operative end of section 15' as being detailed to comprise a hook engaging surface which includes a slot 21 and a notch 22. Slot 21 is of a length and width to engage various sizes of fishhooks. The notch 22 is located opposite the slot 21 and is parabolic in shape with a greater length and width than the slot 21.

Figure 7:
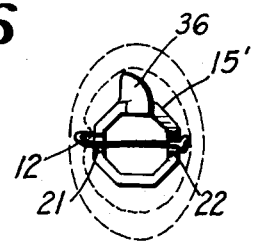
FIG. 7 is a cross-sectional view of the fish's mouth exposing an elevational view of the operational end of the hook rotating means.

As seen in FIGS. 6 and 7, the operative end of section 15' further includes a lobe 36 located on the top of section 15' between the slot 21 and the notch 22. The lobe 36 projects forward of the section 15'.

The outermost section 17 includes upward projections 23 located adjacent its rear end. The projections 23 form a cleat shaped element and are used for securing to the rotating means 11 the fishing line 24 attached to the fishhook 12 prior to effecting a rotation of the rotating means 11.

Figure 3:
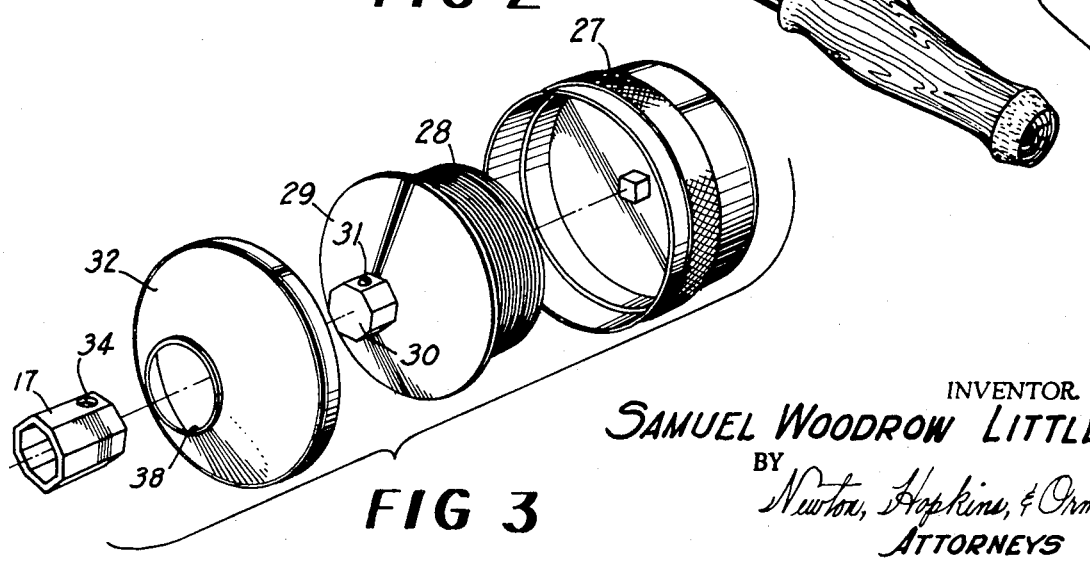
FIG. 3 is a perspective view of the connecting means between the fishhook rotating means and the spinning reel with parts exploded for clarity.

The operable control means 13 is a conventional spinning reel 25 which is adapted to receive the rotating means 11 as hereinafter described and which is secured by suitable means onto a fishing rod 26. As seen in FIGS. 3 and 4, the reel 25 includes at its rear end a housing 27 which contains conventional reel-type mechanism (not shown) which effects an axial rotation of the hook rotating means 11. Disposed within the forward end of the housing 27 is a spool 28 upon which the fishing line 24 is wound. Securing the spool and plate 29 to the housing 27 is a bolt with a hexagonal-shaped bolt head 30 located forward of the spool end plate 29. A spring-biased ball detent 31 is disposed one facet of the hexagonal bolt head 30. The forward end base plate 32 of the spinning reel 25 is positioned over the spool 28 and is secured by suitable means to the reel housing 27. A hole 38 is disposed through the end face plate 32 in alignment with the bolt head 30 and has a diameter sufficient to allow passage therethrough of the outermost section 17 of the rotating means 11. The hole 38 is also of sufficient diameter to freely allow passage of the fishing line 24 simultaneously with passage of the rotating means 11. A hole 34 is disposed through one facet of the outermost section 17 and located behind the protrusions 23. The hole 34 is in alignment with the ball detent 31. A conventional spinning reel handle 35 is mounted on the exterior of the housing 25 and is connected to the reel mechanism within the housing 27.

The rotating means 11 is releasably and frictionally secured to the control means 13 by snapping section 17 onto the bolt head 30 by means of detent 31 engaging the complementary detent surface on the rotating means 11, hole 34 on section 17.

OPERATION

The hook extractor 10 is employed after the fisherman has reeled in his catch and wishes to remove the engaged hook 12 from the fish. The fisherman first snaps the hook rotating means 11 onto the reel 25 as described above. Either of the embodiments of the operative ends of the rotating means 11 shown in FIGS. 5 and 6 may be employed to disengage the fishhook 12.

When the fish is reeled in, the fisherman grasps the fish in his left hand. If the fish is too large or the fisherman is unable to accomplish this maneuver, he may secure the fish in any suitable manner such as placing his foot on the fish to steady it. The fishing line 24 is wrapped a few turns around the exterior of the rotating means 11 and is secured to the protrusions 23.

If the operative end of the rotating means 11 with the flat surface 20 is used and the hook 12 is lodged in the mouth of the fish, the rotating means is inserted into the mouth as shown in FIGS. 2 and 5. The fisherman then turns the handle 35 with his right hand which effects an axial rotation of the rotating means 11 whereby the fishhook 12 is rotated free from its engaged placement. When the fishhook 12 is so dislodged, the rotating means 11 is withdrawn from the fish's mouth. The line 24 is unwound from the rotating means 11 and the protrusions 23. The rotating means 11 can then be pulled free from its engagement on the bolt head 30, and the fisherman can continue fishing.

If the hook 12 is lodged on the exterior of the fish, the same above described operation can be effected while employing the same operative end embodiment of FIG. 5, except, of course, that the rotating means 11 is not inserted into the fish's mouth.

If the operative end of the rotating means 11 with the detailed operative end surface as shown in FIG. 6 is used, the line 24 is wound around the rotating means 11 as described previously. The slot 21 then engages the fishhook 12, preferably at the rounded neck portion or shank of the hook 12, assuming it is not too deeply embedded in the fish. The notch 22 also engages the fishhook 12 along its extended straight portion. The notch 22 cooperates with the slot 21 to urge the fishhook 12 sideways so that the barbed end of the hook 12 will be disengaged from the fish along its path of entry, thus minimizing the tearing of the flesh of the fish. When the hook 12 is thus engaged with the operative end of section 15', the fisherman turns the handle 35 which again effects an axial rotation of the rotating means 11. Referring to FIG. 7, as the rotating means 11 is rotated, the lobe 36 is moved along the inside of the fish's mouth pushing the flesh outward as the lobe 36 is rotated so as to aid in urging the hook 12 from the fish's mouth. The fishhook 12 can be retrieved from the rotating means 11 as described above. The rotating means 11 can then be snapped off the reel 25 to allow the fisherman to continue fishing.

As can be seen, the operative end of section 15 and the operative end of section 15' can be used to disengage a fishhook 12 from the flesh of the fish regardless of where the fishhook 12 is located on the fish. With both embodiments, if the hook 12 is lodged deep in the mouth of the fish, the sections can be pulled out to increase the length of the rotating means 11 so that the operative end can more readily engage the hook 12.

The present invention may be modified in the details in construction without departing from the inventive concept which is sought out in varying scope in the appended claims.

What is claimed is:

1. A fishhook extractor for removing a fishhook lodged in the flesh of a fish comprising,
    means for rotating said fishhook from its engaged placement wherein said rotating means includes an elongated, tubular member with said member constructed of telescoping section for adjusting the effective length of said rotating means;
    a stud formed on one of said telescoping sections, said stud detailed for sliding engagement with a complementary slot extending along a second section;
    a shaped protrusion on said rotating means for securing the fishing line attached to said fishhook prior to effecting a rotation of said rotating means;
    operable control means for effecting rotation of said rotating means, said operable control means including a conventional spinning fishing reel;
    means for releasably securing said rotating means to said control means including a biased detent adapted to engage a complementary detent surface for frictionally and releasably securing said rotating means to said operable means; and
    an operative end on said rotating means including a flat end surface for rotating said hook from its engaged placement.

2. A fishhook extractor for removing a fishhook lodged in the flesh of a fish comprising, means for rotating said fishhook from its engaged placement wherein said rotating means includes an elongated, tubular member with said member constructed of telescoping sections for adjusting the effective length of said rotating means;

a stud formed on one of said telescoping sections, said stud detailed for sliding engagement with a complementary slot extending along a second section;

a shaped protrusion on said rotating means for securing the fishing line attached to said fishhook prior to effecting a rotation of said rotating means;

operable control means for effecting rotation of said rotating means, said operable control means including a conventional spinning fishing reel;

means for releasably securing said rotating means to said control means including a biased detent adapted to engage a complementary detent surface for frictionally and releasably securing said rotating means to said operable means; and an operative end on said rotating means including a hook engaging surface adjacent said operative end with said hook engaging surface comprising a slot with said slot being of sufficient width and length to engage a number of various size fishhooks; a parabolic-shaped notch located opposite said slot with said notch being of a greater width and depth than said slot so as to further aid in disengaging said hook; and a lobe for engaging the interior of the mouth of said fish so said rotating means is rotated so as to urge said flesh away from said hook.

3. A fishhook extractor for removing a fishhook lodged in the flesh of a fish comprising, means for rotating said fishhook from its engaged placement and including means to retrieve said fishhook in response to disengagement of said fishhook from said flesh, said rotating means including an elongated tubular member and means being provided for adjusting the effective length of said rotating means.

4. A fishhook extractor as described in claim 3 wherein said rotating means is constructed of telescoping sections for adjusting said effective length.

5. A fishhook extractor as described in claim 4 wherein said sections are detailed to include a plurality of faceted sides.

6. A fishhook extractor as described in claim 5 wherein said sections are hexagonal in shape.

7. A fishhook extractor as describe in claim 4 wherein said telescoping sections include a stud formed on one of said sections, said stud detailed for sliding engagement with a complementary slot extending along a second section.

8. A fishhook extractor for removing a fishhook lodged in the flesh of a fish, comprising means for rotating said fishhook from its engaged placement and including means to retrieve said fishhook in response to disengagement of said fishhook from said flesh, said fishhook extractor further including operable control means for effecting rotation of said rotating means and said rotating means including means for releasably securing said rotating means to said control means.

9. A fishhook extractor as described in claim 8 wherein said operable control means includes a conventional spinning fishing reel.

10. A fishhook extractor as described in claim 9 wherein said releasable securing means includes a biased detent adapted to engage a complementary detent surface for frictionally and releasably securing said rotating means to said operable control means.

11. A fishhook extractor for removing a fishhook lodged in the flesh of a fish comprising, means for rotating said fishhook from its engaged placement and including means to retrieve said fishhook in response to disengagement of said fishhook from said flesh, said rotating means including an operative end detailed to include a hook engaging surface adjacent said operative end, said hook engaging surface including a slot of sufficient width and length to engage a number of various sized fishhooks, said hook engaging surface also including a parabolic shaped notch located opposite said slot, said notch being of a greater width and depth than said slot so as to further aid in disengaging said fishhook.

References Cited

UNITED STATES PATENTS

| 3,154,879 | 11/1964 | Crooke | 43—53.5 |
| 3,132,438 | 5/1964 | Ward et al. | 43—53.5 |
| 2,447,554 | 8/1948 | Bates | 43—53.5 |
| 2,897,626 | 8/1959 | Buller | 43—53.5 |

LOUIS G. MANCENE, Primary Examiner

D. J. LEACH, Assistant Examiner